UNITED STATES PATENT OFFICE.

JOSIAH J. SHERMAN, OF ALBANY, NEW YORK.

IMPROVEMENT IN PROCESSES FOR PREPARING LIQUIDS FOR AIDING DIGESTION.

Specification forming part of Letters Patent No. 12,834, dated May 8, 1855; antedated March 13, 1855.

*To all whom it may concern:*

Be it known that I, JOSIAH J. SHERMAN, of the city and county of Albany, in the State of New York, have discovered a new and useful Improvement on Manufactured Malt-Liquor Beverages, whereby a new composition of matter is produced which may be denominated "gastricized malt liquor," or, more particularly, "gastricized ale, beer, porter, &c.," as the case may be; and I do hereby declare that the following specification contains a description thereof.

My improvement consists, first, in changing the condition of the alimentary or other digestible matter contained in malt-liquor beverages by infusing a solution, hereinafter described, which, without perceptibly affecting the tart or flavor or impairing the aromatic odor or the tonic or other virtues of the liquor renders such matter more readily separable and convertible into chyme when taken into the stomach, and thus relieves and aids the gastric powers of digestion; second, in further changing the character of malt-liquor beverages by such further infusion of this solution as, besides serving as a solvent to the digestible mattter of the liquor, as above stated, will further serve as a gastric solvent to the alimentary contents of the stomach.

This solution is obtained and prepared substantially in the following manner, to wit: Emptying the fourth stomach of a recently-slaughtered ox of its contents, and sponging or gently washing away (as nearly as may be without disturbing the gastric juice contained within and about the substance of the membrane) the whole or greater portion of mucus from its lining membrane. This membrane is separated from the stomach by dissection or otherwise, and placed in one gallon of warm water acidulated by hydrochloric or muriatic acid to a degree rendering it only just perceptibly acid to the taste. To effect this acidulation about six drams of the aqueous solution of muriatic acid (more or less, according to its density) will suffice. The water is kept at a temperature not exceeding 90° Fahrenheit. If kept at 90° the membrane is allowed to steep four hours. If kept at 70° it is allowed to steep six hours, and for about a corresponding variation of time for any intermediate or lower temperature. The whole is to be thoroughly stirred about once an hour to promote solution. Wooden, earthen, or glass vessels only should be used in preparing this solution or to contain it afterward, as an injurious chemical action between the acid and the substance of the vessel takes place if metals are used. At the end of the required time the solution is strained through a fine sieve, after which it is filtered, and it is then ready for use. If not to be used within a day or so after its preparation, it should be bottled or otherwise confined to preserve its rich aromatic odor. It is, however, antiseptic in its character, and will keep in the open air a considerable length of time (greater or less, according to temperature) without materially impairing its virtues.

This solution, though very inactive as a digestive at low temperatures, has at the temperature of the human stomach (about 100° Fahrenheit) a similar or the same digestive or solvent power over alimentary matter with that possessed by the living stomach. (See Liebig's Familiar Letters on Chemistry, chapter 16.) It readily diffuses itself in malt liquor and unites with it in all proportions. It is to be used in the following manner:

After the manufacture of the malt liquor has been completed in any of the usual modes adapting it to the tastes, requirements, or custom of the markets or localities for which it may be intended, whether to be known as ale, beer, lager-beer, or porter, or by whatsoever other designation, and it is ready to be put up in casks, bottles, or other packages. The solution is to be added by simply pouring it in and aiding its general diffusion by a gentle stirring of the liquor.

If it is designed to use the new composition freely as a beverage without reference to the full or empty condition of the stomach, the solution need be used only in such proportions as will serve, when received into the stomach, to digest the digestible matter contained in the malt liquor. For this purpose the proportion of one part of solution to fifty parts of malt liquor, by measure, is deemed sufficient for that which is commonly known in commerce as "Albany" or "Philadelphia" ale, or a greater or less proportion, according as the liquor may be materially more or less highly malted or otherwise charged with vegetable matter; but as any smaller proportion of solution will have its proportionate effect it is obvious that this proportion may be diminished even to one part of the solution to a thousand parts of malt liquor without entirely dispensing with its advantages as a superadded gastric solvent. Hence any intermediate proportion may be adopted, according to the choice of the consumer or the manufacturer.

If it is designed to use the new composition more especially as an aid to the digestion of the contents of the stomach, the solution may be added in the proportion of one part of the solution to fifteen parts of malt liquor by measure. In this case the proper times to be taken are during or immediately after meals only, and in quantity not exceeding the proportion of half a pint for a full meal of an adult in good general health, and in smaller quantities, according to the lightness of the meal and the health and age of the individual; but as this last preparation is designed for the use of dyspeptics and other invalids only, and imperfect digestion in their case is always more or less complicated with other disorders of the system, which cannot be properly known and understood by the unprofessional man, no general rule as to the quantity or even the propriety of its use at all can be given, and it should therefore not be used without the advice of an intelligent physician.

After the solution is added the malt liquor is to be confined in packages in the usual manner, and will be fit for use at the time before contemplated by the manufacturer without reference to the addition of the solution. It is to be kept, transported, dispensed, and used just as before, except that in the case of the composition by proportions last described it is to be used with the qualifications in that case explained.

I wish it to be understood that I do not mean to confine myself to the precise mode of obtaining or preparing the gastric solution described, nor to the proportions stated, nor to the mode nor time of adding it to the malt liquor.

The lining membrane of the stomach of animals generally possesses the desired property, (see Liebig's Letters as before quoted;) but from obvious notions of delicacy preference is to be given to the stomachs of animals used as food by man, any of which may be used, due allowance being made for difference of quantity of mucous membrane as compared with the stomach of the ox.

The solution may be added to the malt liquor at any time after the latter has been put up in bottles or other packages, proper care being taken to inject it in such a manner as not to allow the carbonic acid of the malt liquor to escape during or after the injection.

The packages should be designated by the word "low" or "high" or "medium," applying the designation "low" to those containing the solution in or below the proportion of one part to fifty, and the word "high" to those containing it in or above the proportion of one part to fifteen, and the word "medium" to those containing it any intermediate proportion. Any further precision may be had by stating the exact proportions by fractions, thus: one-twentieth, one twenty-fifth, one-tenth, &c., as the case may be.

I do not claim as my invention or discovery the solution used, that being substantially described by Liebig, nor any part of the manufacture of malt liquors; but What I do claim as my discovery or improvement, and desire to secure by Letters Patent, is—

The new composition produced substantially as set forth in the foregoing specification.

JOSIAH J. SHERMAN.

Witnesses:
PAUL T. COOPER,
O. L. HOLLEY.